(12) United States Patent
Lundgren et al.

(10) Patent No.: US 7,397,540 B2
(45) Date of Patent: Jul. 8, 2008

(54) PHASE DIVERSITY RANGING SENSOR

(75) Inventors: Mark A. Lundgren, Fullerton, CA (US);
Jean J. Dolne, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/507,879

(22) Filed: Aug. 21, 2006

(65) Prior Publication Data

US 2008/0043217 A1    Feb. 21, 2008

(51) Int. Cl.
*G01C 3/08* (2006.01)
(52) U.S. Cl. ............... 356/4.03; 356/4.05; 356/4.06
(58) Field of Classification Search ............ 356/4.03, 356/4.05, 4.06
See application file for complete search history.

(56) References Cited

U.S. PATENT DOCUMENTS

| | | | | |
|---|---|---|---|---|
| 4,639,140 A | * | 1/1987 | Lerat | 356/609 |
| 5,576,975 A | * | 11/1996 | Sasaki et al. | 705/158 |
| 6,469,838 B2 | * | 10/2002 | Tawa et al. | 359/668 |
| 6,618,349 B2 | * | 9/2003 | Inoue et al. | 369/275.4 |
| 2004/0179203 A1 | * | 9/2004 | Straehle | 356/497 |

FOREIGN PATENT DOCUMENTS

WO    WO 2006082544 A2 *    8/2006

OTHER PUBLICATIONS

J.R. Fienup, "Phase retrieval algorithms: a comparison", Applied Optics, vol. 21, No. 15, Aug. 1, 1982 (pp. 2758-2769).
J.R. Fienup, "Comparison of Phase Diversity and Curvature Wavefront Sensing", SPIE Conference on Adaptive Optical System, Mar. 1998, SPIE vol. 3353 (pp. 930-940).
Mats Lofdahl, "A Predictor Approach to Closed-Loop Phase-Diversity Wavefront Sensing", Royal Swedish Academy of Sciences, SPIE 4013-51, Germany, Mar. 2000 (pp. 1-12).
Stuart M. Jeffries, "Sensing Wave-front amplitude and phase with phase diversity", Applied Optics, vol. 41, No. 11, Apr. 10, 2002 (pp. 2095-2102).
J.R. Fienup, "Phase Retrieval:Hubble and the James Webb Space Telescope", The Institute of Optics, Mar. 2003 (pp. 1-22).
Heather I. Campbell, "Generlized Phase Diversity for Wave-Front Sensing", Optical Society of America, vol. 29, No. 23, Dec. 1, 2004 (pp. 2707-2709).

* cited by examiner

*Primary Examiner*—Thomas H. Tarcza
*Assistant Examiner*—Timothy A Brainard
(74) *Attorney, Agent, or Firm*—MacPherson Kwok Chen & Heid LLP; Greg J. Michelson (57) ABSTRACT

A system to determine the distance to an object includes one or more aberrating elements to introduce aberration into light from the object. Image data is obtained at two different focus conditions, and used to determine the object distance.

20 Claims, 7 Drawing Sheets

Focus Plane 2

Focus Plane 1

PHASE DIVERSITY RANGING SENSOR

BACKGROUND

1. Field of Invention

This invention generally relates to distance determination, particularly distance determination for space applications.

2. Related Art

Determining a distance to a particular object may be difficult in some circumstances. For example, it may be difficult to determine the distance (range) to an object in space. Distances of interest in space application range from a few meters to kilometers.

Existing ranging systems are passive or active systems. In a passive system, existing radiation is used. In an active system, radiation is generated by the system, reflects from the object of interest, and the reflected radiation is detected.

However, existing systems may be unduly complex or cumbersome. For example, active ranging systems generally have high laser power supply requirements and are detectable by counter-measures. Passive ranging systems generally require long baselines (for stereo ranging systems), and/or moving the measurement system. Additionally, systems that use object size or features to estimate range require the object to be very large or very close, in order to resolve it well enough to determine range.

SUMMARY

Systems and techniques provided herein allow for efficient and accurate distance determination by introducing one or more aberrating elements into the optical path from an object. Image information is then obtained at different focus conditions, and processed to determine the distance. The systems and techniques herein are particularly useful for space applications in which the distance to an object is large enough that its size and/or features cannot be resolved sufficiently to determine that distance.

In general, in one aspect, an optical system comprises an imaging lens positioned to receive light from an object and one or more aberrating elements configured and positioned in the optical path of the light from the object and configured to aberrate the light from the object to produce aberrated light. The optical system further comprises a detection system configured to receive aberrated light from the one or more aberrating elements at a first focus condition and a second focus condition and to generate information indicative of the aberrated light at the first focus condition and the second focus condition. The optical system further comprises a processor system configured to receive the information indicative of the aberrated light at the first focus condition and information indicative of aberrated light at the second focus condition and to generate distance information therefrom.

Different aberrating elements may be used, and may introduce one or more types of aberration, including astigmatism, coma, etc. The one or more aberrating elements may comprise a cylindrical lens. The one or more aberrating elements may comprise a deformable optical element. The one or more aberrating elements may comprise a substantially planar plate tilted with respect to the light from the object, wherein the plate is positioned to receive converging light from the imaging lens.

The optical system may further comprise a beam splitter configured to split light from the object into at least a first portion and a second portion, and the detection system may comprise a first detection element positioned to receive the first portion at a first focus condition and a second detection element positioned to receive the second portion at a second different focus condition. The beam splitter may be integrated with at least one of the one or more aberrating elements.

The detection system may comprise a single detector having a first region and a second region, and wherein the first region is positioned to receive light at the first focus condition and the second region is positioned to receive light at the second focus condition. The first region and the second region may at least partially overlap. The detection system may comprise a first detector and a second detector separate from the first detector.

The one or more aberrating elements may include at least one selected from the group consisting of a cylindrical lens, a tilted transparent planar substrate, a deformable lens, a deformable mirror, and a variable-tilt transparent planar substrate. The imaging lens may comprise one or more lens types selected from the group consisting of a camera lens and a telescope lens. The one or more aberrating elements may be configured to introduce astigmatism into the system.

The one or more aberrating elements may comprise a substantially planar plate positioned to receive light from the imaging lens. The substantially planar plate may be removable or rotatable or both. The detection system may comprise a single detector having a first region and a second region, and wherein the first region is positioned to receive light from a first portion of the substantially planar plate at the first focus condition and the second region is positioned to receive light at the second focus condition from a second portion of the substantially planar plate.

In general, in another aspect, a method of determining an object distance may comprise introducing a pre-determined aberration to light received from the object to generate an aberrated wavefront, obtaining image data of the aberrated wavefront at a first focus condition and a second different focus condition, and determining the object distance using the image data at the first focus condition and the second focus condition.

The method may further comprise receiving divergent light from the object at a lens and generating a converging wavefront therefrom. Introducing the pre-determined aberration to the light received from the object may comprise introducing the pre-determined aberration to the converging wavefront to generate the aberrated wavefront.

Determining the object distance using the image data at the first focus condition and the second focus condition may comprise generating one or more wavefront coefficients using a phase diversity algorithm to process the image data at the first focus condition and the second focus condition. Determining the object distance using the image data at the first focus condition and the second focus condition may comprise determining the object distance using the one or more wavefront coefficients. The method may further comprise determining the object distance using calibration information.

These and other features and advantages of the present invention will be more readily apparent from the detailed description of the exemplary implementations set forth below taken in conjunction with the accompanying drawings.

BRIEF DESCRIPTION OF THE DRAWINGS

Like reference symbols in the various drawings indicate like elements.

DETAILED DESCRIPTION

Systems and techniques provided herein allow for accurate measurement of distances in the meter to kilometer range. The systems may be incorporated into existing camera systems, and require significantly less power than laser and radar ranging systems. Thus, they may be beneficial for applications in which power is limited, as well as applications in which size is important. Additionally, because of their relative simplicity, the techniques may be implemented at low cost.

Figure 1:
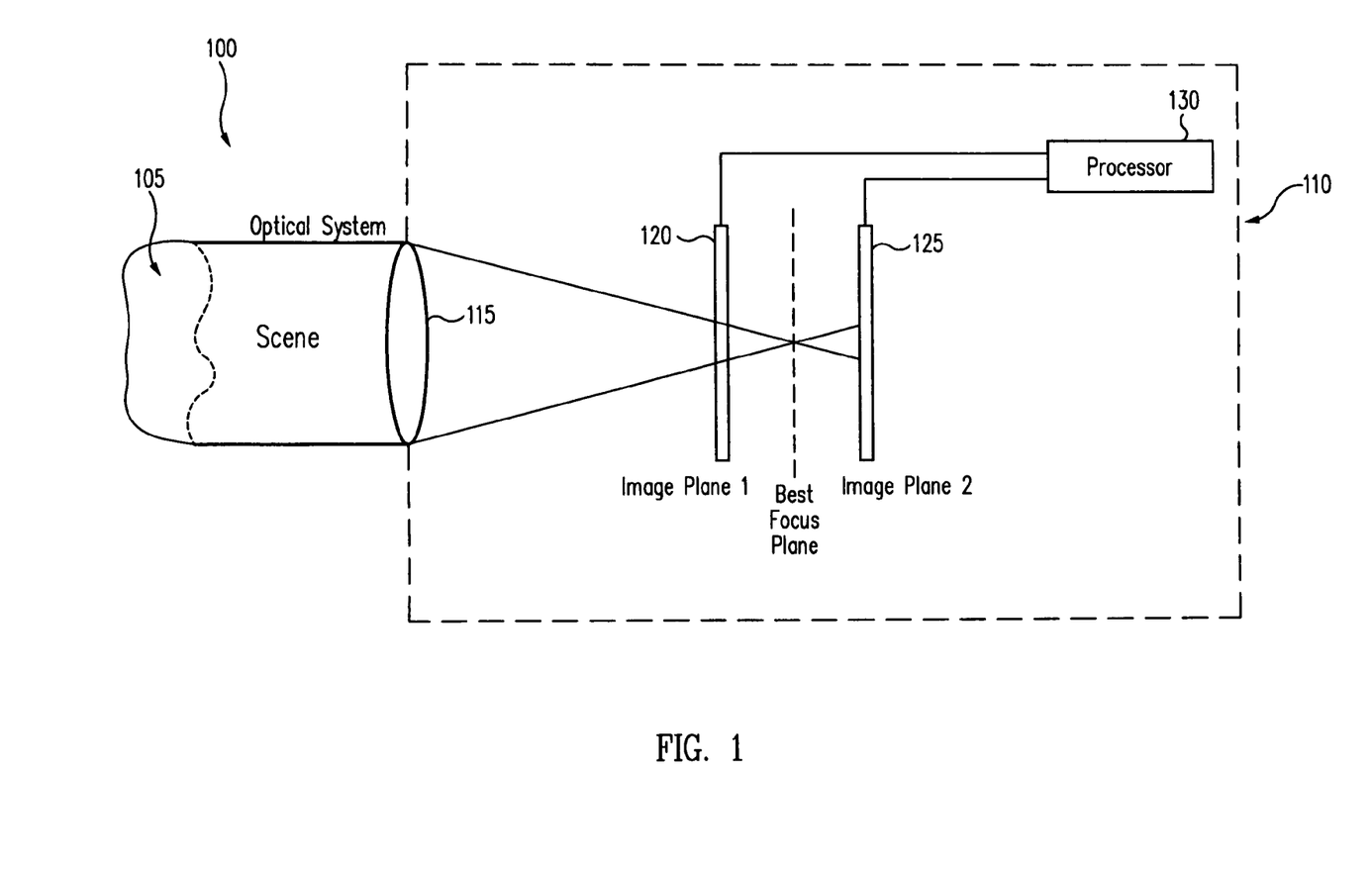
FIG. 1 is a schematic diagram of a system for phase diversity imaging.

Embodiments of the current invention use phase diversity to determine the distance to an object of interest. In some prior art systems, phase diversity imaging is used to counter-act the affect of aberration on image quality. FIG. 1 illustrates a simple system 100 for image processing using phase diversity.

An object 105 is at a distance D from an optical system 110. Note that FIG. 1 is not shown to scale; for example, D is much larger than the relative separations of elements in optical system 110. Optical system 110 includes an imaging lens 115, a first detection element 120 in an Image Plane 1, a second detection element 125 in an Image Plane 2, and a processor 130 in communication with first detection element 120 and second detection element 125.

A pre-existing source of optical aberration, such as the atmosphere, is in the optical path between object 105 and lens 115. Because of the aberration, an image obtained at the best focus plane may not provide the desired image quality. In order to improve image quality, image information is obtained in two image planes, one on either side of the best focus plane. The image information is processed using a processor 130 to correct for aberration, to generate a single image of object 105 with enhanced image quality.

By contrast, systems and techniques provided herein introduce one or more aberrating elements into the optical system to generate information indicative of the position of the object. Additionally, rather than processing image information at two detection positions to improve image quality, the image information is processed to determine distance information.

Figure 2:
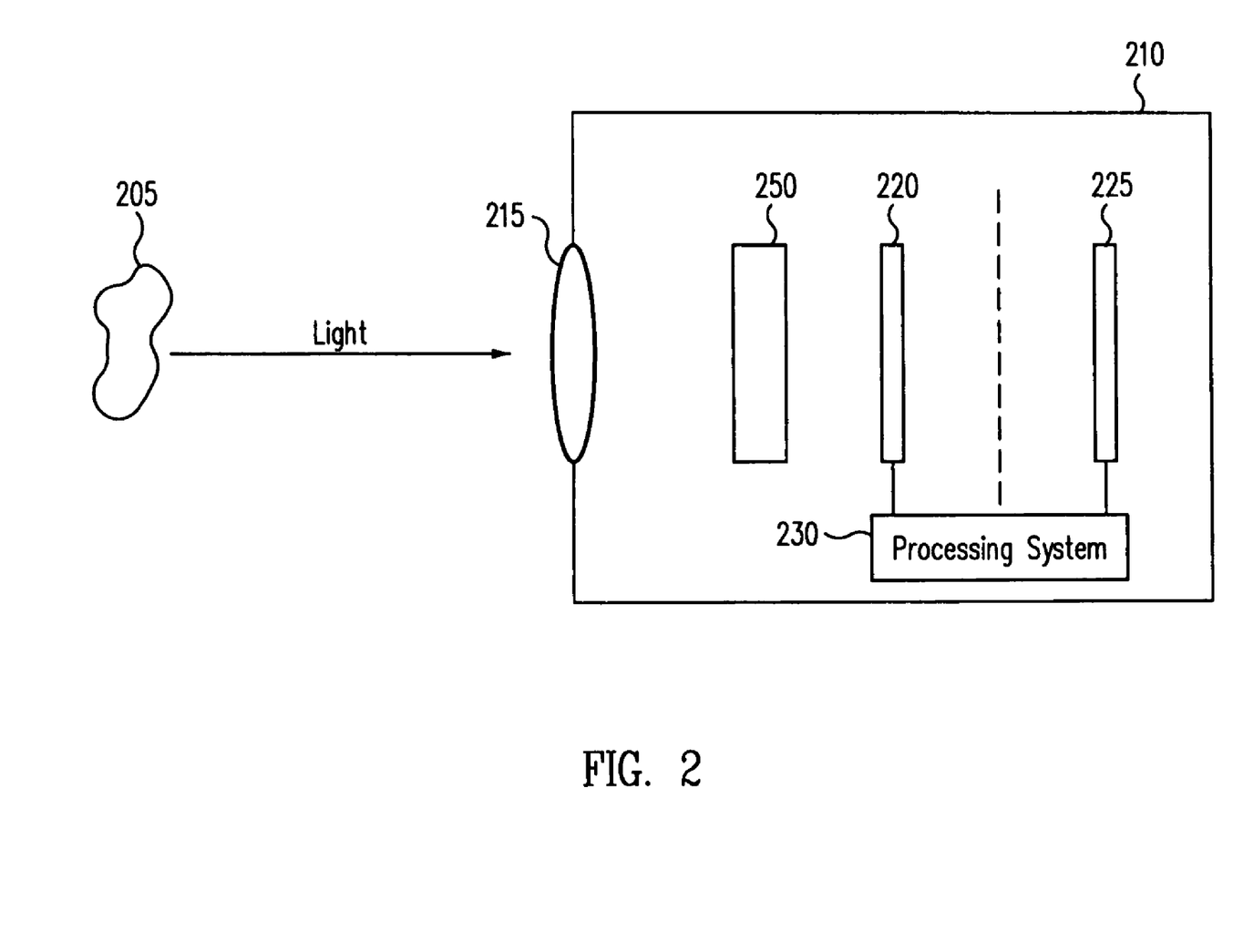
FIG. 2 is a schematic diagram of a system to determine object distance using induced aberration, according to some embodiments.

FIG. 2 shows a simplified diagram of a system 200 to determine the distance D to an object 205, according to some embodiments. Light from an object 205 is incident on an optical system 210, such as a camera. Light enters system 210 through a lens 215, and is then incident on one or more aberrating elements such as aberrating element 250. Aberrating element 250 is positioned in the optical path from object 205 and is configured to introduce aberration into the light from object 205. The amount of aberration may be a pre-determined amount, selected to provide suitable performance of system 200.

A first detector 220 and a second detector 225 are positioned and configured to receive light into which aberration has been introduced. First detector 220 receives light at a first focus condition, and second detector 225 receives light at a second different focus condition. It should be noted that first detector 220 and second detector 225 need not be positioned in a linear configuration (as shown in FIG. 2), and need not be separate elements. For example, as described below, first detector 220 may be a first portion of an image detector, while second detector 225 may be a second portion of an image detector.

In some embodiments, aberrating element 250 may be removable (i.e., configured so that it may be removed from the optical path between the object and the detectors), so optical system 210 may perform other functions, such as imaging. In some embodiments, aberrating element 250 may remain in the optical path, but be modified so that it no longer produces significant aberration (see FIG. 6 and the associated discussion).

One particularly useful type of aberration is astigmatism. Astigmatism is an aberration in which the focus in one direction is different than the focus in a second direction. For example, an image may be in focus along a horizontal axis at a first distance from the object, but out of focus along a vertical axis. At a second different distance from the object, the image may be in focus along the vertical axis but out of focus along the horizontal axis. The current inventors recognized that introducing astigmatism into an optical system such as system 200 allows for accurate distance determination, since the resulting images are asymmetric; that is, the images change differently in different directions for different distances between the optical system and the object.

Figure 3A:
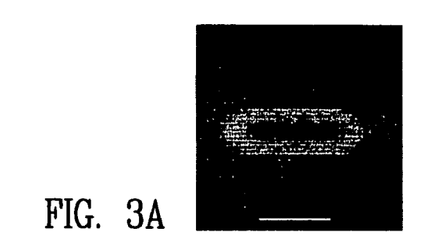
FIGS. 3A to 3F are simulated images at two focus conditions and three distances.
Figure 3B:
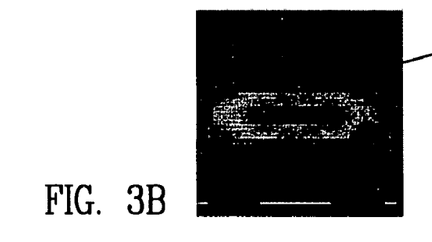
Figure 3C:
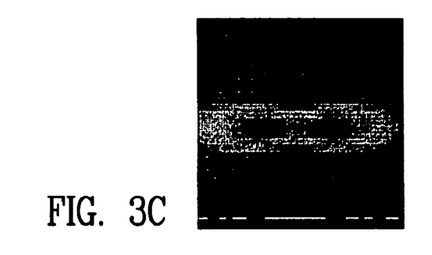
Figure 3D:
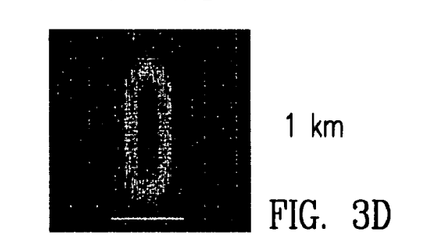
Figure 3E:
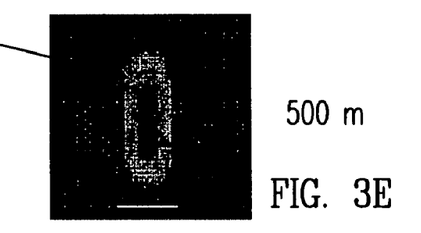
Figure 3F:
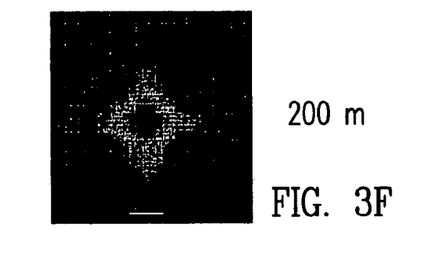
Figure 4A:
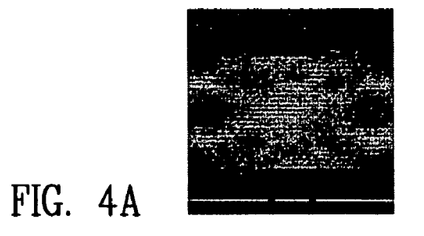
FIGS. 4A to 4F are simulated images at the two focus conditions of FIGS. 3A to 3F, at three different distances.
Figure 4B:
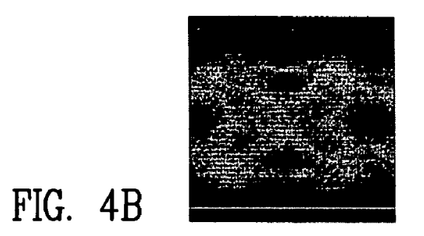
Figure 4C:
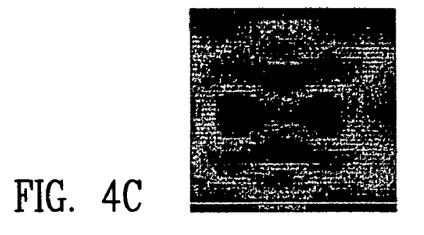
Figure 4D:
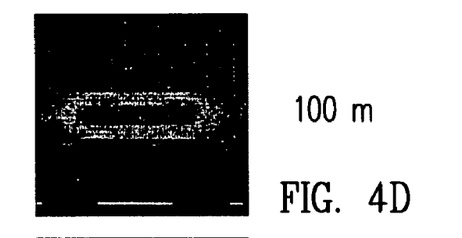
Figure 4E:
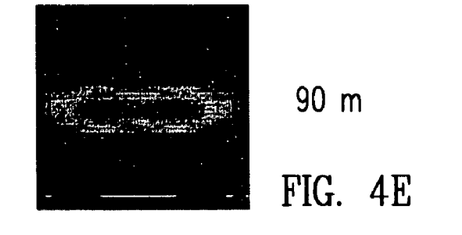
Figure 4F:
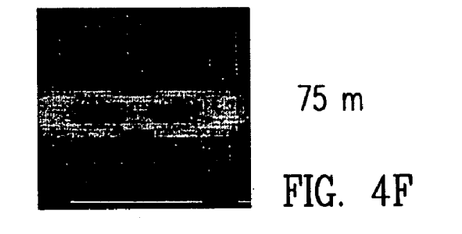

FIGS. 3A to 3F show images in two focus planes, for an object at three different distances. FIGS. 3A to 3C show images of an object of an object in a first focus plane (e.g., a plane corresponding to the first focus condition of FIG. 2), at distances of 1 km, 500 m, and 200 m. FIGS. 3D to 3F show images of the object in a second different focus plane (e.g., a plane corresponding to the second focus condition of FIG. 2) at the same distances. The images of FIGS. 3A to 3F correspond to an embodiment in which the one or more aberrating elements introduce astigmatism into the optical system. The images of FIGS. 3A to 3F are simulated, using parameters for one particular optical system design. As the images illustrate, the particular optical system is more sensitive to changes in the 200 to 500 meter range than in the range from 500 meters to one kilometer. However, the optical system parameters may be selected provide the needed accuracy in particular distance ranges of interest.

FIGS. 4A to 4G show additional images obtained using the same simulation parameters, for distances between 75 meters and 100 meters. As the figures illustrate, the images change substantially for distances in this range.

As noted above, the simulations of the above-described figures assumed a particular optical system. However, in order to vary the range in which distance measurements are accurate, the configuration of the optical system may be varied. In general, accurate distance measurements may be made to about one quarter of the depth of field of the optical system used.

Figure 5:
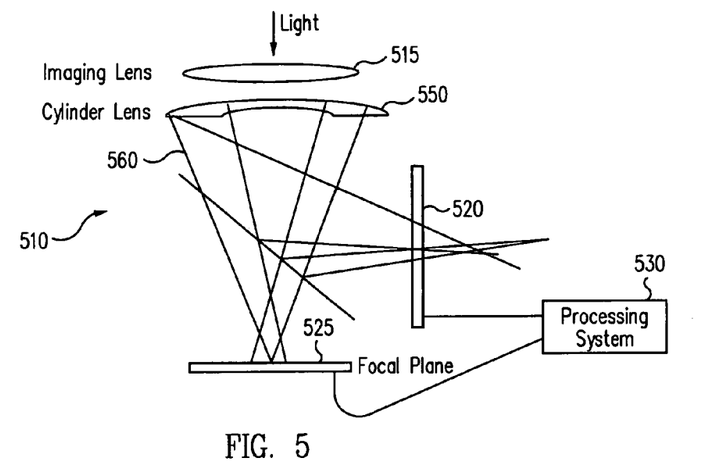
FIG. 5 shows an embodiment of an optical system including an aberrating element.

A number of optical systems may be used to implement phase diversity ranging. FIG. 5 shows an embodiment of a portion of an optical system 510 to implement the current techniques.

Light from an object is first incident on a lens 515. Lens 515 may be a standard imaging lens for a camera (still and/or video). The light is then incident on an aberration element 550; in FIG. 5, a cylindrical lens. The cylindrical lens acts as a source of astigmatism (a type of aberration) in optical system 510.

In order to detect light at two different focus conditions, a beam splitter 560 is positioned in the optical path after cylindrical lens 550. Beam splitter 560 directs a first portion of the light toward a first detection element 520, and a second portion of the light toward a second detection element 525. Beam splitter 560 may be selected so that about half of the light is directed to first detection element 520 and half the light is directed to second detection element 525 (although other configurations may be used).

First detection element 520 and second detection element 525 may be imaging devices such as CCD array detectors, CMOS detectors, vidicons, or other ultraviolet (UV), visible, infrared (IR), near infrared (NIR), or other focal plane imaging device types. First detection element 520 and second detection element 525 generate image information based on the received light.

Image information from first detection element 520 and second detection element 525 is provided to a processing system 550. Processing system 550 is configured to determine a range based on the information received from first detection element 520 and second detection element 525, as explained in more detail below.

Figure 6:
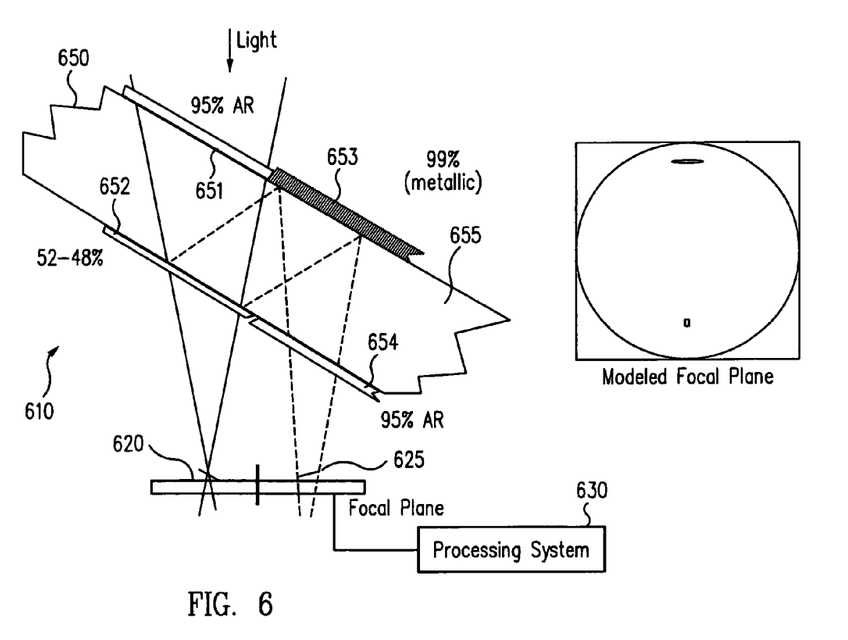
FIG. 6 shows another embodiment of an optical system including an aberrating element.

FIG. 6 shows another embodiment of an optical system 610 to introduce aberration into the optical path from an object, to determine the distance to the object.

In FIG. 6, an aberrating element 650 comprises a substantially planar plate. An imaging lens (not shown) receives light from the object and modifies the light to be convergent. By tilting the plate with respect to the incoming convergent light, the light traverses different optical paths in the vertical than the horizontal, introducing astigmatism into the optical path of the light. In the illustrated example, a plate with n=1.5 and 1 mm thick tilted at about 45 degrees has a change in focus of about 3.8 mm.

The plate includes a transparent substrate 655, and a first transmissive region 651. First transmissive region 651 may comprise an antireflective material such as a 95% anti-reflective coating on substrate 655. Light from an object is incident on first transmissive region 651, and substantially transmitted through substrate 655 to a beam splitter region 652. Region 652 is configured to transmit a portion of light and reflect a portion of light. In the illustrated embodiment, beam splitter region 652 is configured to reflect about 52% of the light and transmit about 48% of the light.

The transmitted portion of the light is incident on a first detector region 620 of a detector. First detector region 620 may be a portion of an array detector. The reflected portion of the light is incident on a reflective region 653; for example, a 99% reflective metallic coating on substrate 655. The light is reflected from region 653 and is transmitted through transmissive region 654. Transmissive region 654 may be a 95% antireflective coating on substrate 655. The light is then incident on a second detector region 625 of the detector, which may be a different portion of the array detector.

Image information is transmitted from the detector to a processing system 650 to determine the object distance from information corresponding to first detector region 620 and second detector region 625. The embodiment illustrated in FIG. 6 has the advantage that a single detector may be used to obtain information for two different focus conditions. This may provide for decreased cost and complexity, and simpler processing.

As noted above, in some embodiments, the optical system may be configured so that the aberrating element(s) can be removed from the optical path between the object and the detection elements. For example, the planar plate (which may be about a millimeter thick) may be driven into and out of the optical path of the incoming light, if desired. For the optical system shown in FIG. 6, optical system 610 may be configured so that the planar plate is substantially perpendicular to the incoming light. In the absence of tilt, the planar plate no longer introduces astigmatism into the optical system, and the detector can be used for imaging.

Figure 7A:
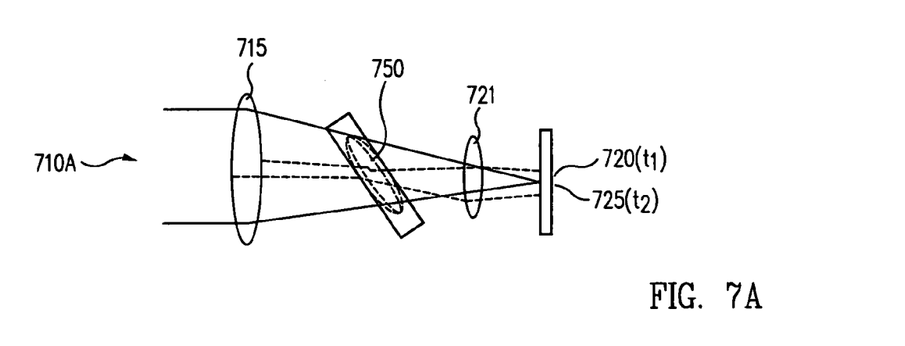
FIGS. 7A and 7B show embodiments of optical systems including an aberrating element.
Figure 7B:
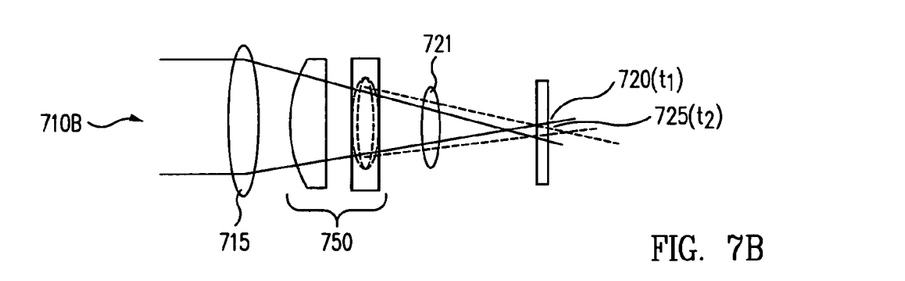

FIGS. 7A and 7B show embodiment of optical systems 710A and 710B that may be used to determine a distance to an object. In the embodiments of FIGS. 7A and 7B, the focus condition varies with time, so that a single detector may be used.

In FIG. 7A, light from an object passes through an imaging lens 715 to an aberrating element 750. Aberrating element 750 includes a mount-tilted variable power lens. The aberrated light then passes through another imaging lens 721 to be incident on a detector.

The variable power lens may be a lens such as those produced by Varioptic, of France. The lens deforms in response to an electrical signal, so that the focus condition can be different at a time $t_1$ than it is at a different time $t_2$. At $t_1$, a detection area 720 of the detector is used to obtain data indicative of the first focus condition, while at $t_2$, a detection area 725 of the detector is used to obtain data indicative of the second focus condition. Detection areas 720 and 725 may encompass the same physical area of the detector.

The embodiment of FIG. 7A has the benefit that optical system 710A may be configured to tilt aberrating element 750 at an appropriate angle to induce aberration into system 710A, in order to obtain information for distance determination, but may also be configured to position element 750 substantially perpendicular to the incoming light from the object so that element 750 introduces substantially no aberration. Optical system 710A may then be used for other functions (e.g., to obtain images).

In the embodiment of FIG. 7B, aberrating element 750 includes two elements: a cylindrical lens to introduce aberration, and a variable power lens to vary the focus condition at different times. Like the embodiment of FIG. 7A, at $t_1$, a detection area 720 of the detector may be used to obtain data indicative of the first focus condition, while at $t_2$, a detection area 725 of the detector may be used to obtain data indicative of the second focus condition. In order to remove the induced aberration from system 710B, the cylindrical lens may be moved out of the optical path between the object and the detector. Note that the term "aberrated light" herein refers to a wavefront that has been aberrated.

Figure 8A:
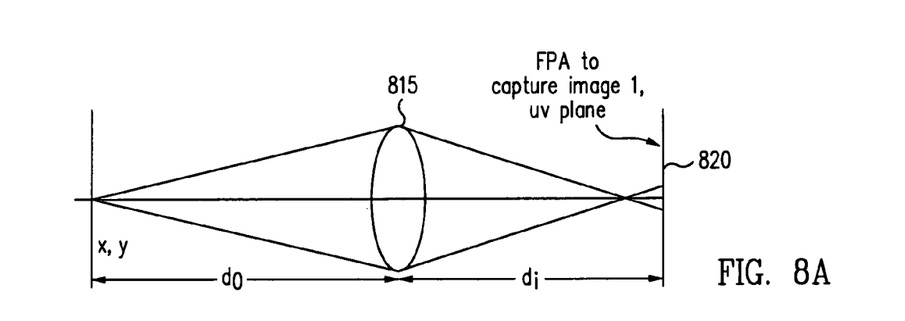
FIGS. 8A and 8B illustrate distance determination principles.
Figure 8B:
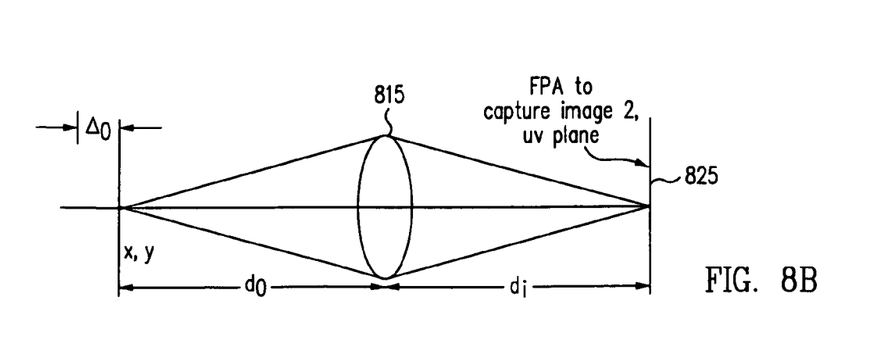

Systems such as those described above provide for distance determination using captured image data for an object at two focus conditions. Distance determination is described with reference to FIGS. 8A and 8B. FIGS. 8A and 8B illustrate capturing image data using one focal plane array for simplicity. The image data obtained with the object at distance $d_0$ from the telescope (represented by imaging lens 815 in FIGS. 8A and 8B) is called the "best-focus" image. That obtained with the object at distance $d_0' = d_0 + \Delta_0$ from the telescope is called the defocused image (this image is out of focus). In the embodiment of FIGS. 8A and 8B, detection elements 820 and 825 are regions of a particular focal plane array (FPA) receiving light from different objects.

From wave optics formalism, the scalar field obtained at the focal plane position due to a point illuminated in FIG. 8A is given by Equation (1) below (ignoring the amplitude scaling term):

$$a(u, v) = \exp(jk/2d_i)(u^2 + v^2)$$
$$\int \exp\left[(jk/2)(x^2 + y^2)\left(\frac{1}{d'_0} + \frac{1}{di} - \frac{1}{f}\right)\right]\exp\left[-\frac{jk}{d_i}(ux + vy)\right]dxdy$$

In Equation (1), a(u,v,) is the intensity of the recorded image, in imager coordinates, x and y are object coordinates, as indicated in FIGS. 8A and 8B, j is the square root of negative one, and k is the wave number (where k is complex in an absorbing medium).

Because of the difference in distance between the two object positions in FIG. 8A and FIG. 8B, the image condition $$\frac{1}{d'_0} + \frac{1}{di} - \frac{1}{f} = 0$$

is not satisfied for FIG. 8A. However, the condition $$\frac{1}{d'_0 - \Delta_0} + \frac{1}{di} - \frac{1}{f} = 0$$

is satisfied. If we consider that $\Delta_0 << d_0'$, we have:

$$\frac{1}{d'_0} + \frac{\Delta_0}{(d'_0)^2}\frac{1}{di} - \frac{1}{f} = 0$$

which, when substituted into Equation (1) above, yields Equation (2):

$$a(u, v) = \exp(jk/2d_i)(u^2 + v^2)$$
$$\int \exp\left[(jk/2)(x^2 + y^2)\frac{\Delta_0}{(d'_0)^2}\right]\exp\left[-\frac{jk}{d_i}(ux + vy)\right]dxdy$$

Equation (2) suggests that we can determine the distance $\Delta_0$ between two similar objects. This implies that the reflectivities of the two objects must be the same or they must be known a priori. With this set of data and with a maximum likelihood technique, one can determine what the relative distance between the two objects is. For more details about wave-front sensing, please see "Practical Issues in Wavefront Sensing by Use of Phase Diversity," *Appl. Optics*, by Jean J. Dolne, Richard J. Tansey, Katherine A. Black, Jana H. Deville, Philip R. Cunningham, Kenneth C. Widen, and Paul S. Idell, 5284-5289, 2003, which is hereby incorporated by reference in its entirety.

By introducing a known aberration into the imaging system (such as the systems described above and illustrated in the associated figures), the distance of a single object may be obtained. In some embodiments, existing phase diversity algorithms may be used to estimate phase diversity wavefronts, based on the known aberration.

Examples of phase recovery algorithms are described in "Phase Retrieval Algorithms: A Comparison," J. R. Fienup, *Applied Optics*, Vol. 21, No. 15, 1 August 1982, which is hereby incorporated by reference in its entirety. Phase retrieval in the context of space systems is described in "Phase Retrieval: Hubble and the James Webb Space Telescope," J. R. Fienup, *The Institute of Optics*, March 2003, "Phase Retrieval and Diversity in Adaptive Optics," Gonzalves, *Optical Engineering*, vol. 21, 829-832, (1982), and "Joint Estimation of Object and Aberrations by Using Phase Diversity," R. G. Paxman, T. J. Schulz, and J. R. Fienup, *Journal of the Optical Society of America A,* 9(7), 1072-1085 (July, 1992), which are hereby incorporated by reference in their entirety. Other algorithms may be used; one skilled in the art will recognize that phase diversity processing may be performed with many different approaches, chosen based on need for speed, processing power, memory availability, and other factors.

Although the above describes determination of relative distance between two optically similar objects, the principles can be used to determine the distance to an object; for example, using a calibration object such as a star or other sufficiently distant object, or by using a prior position of the object.

Figure 9:
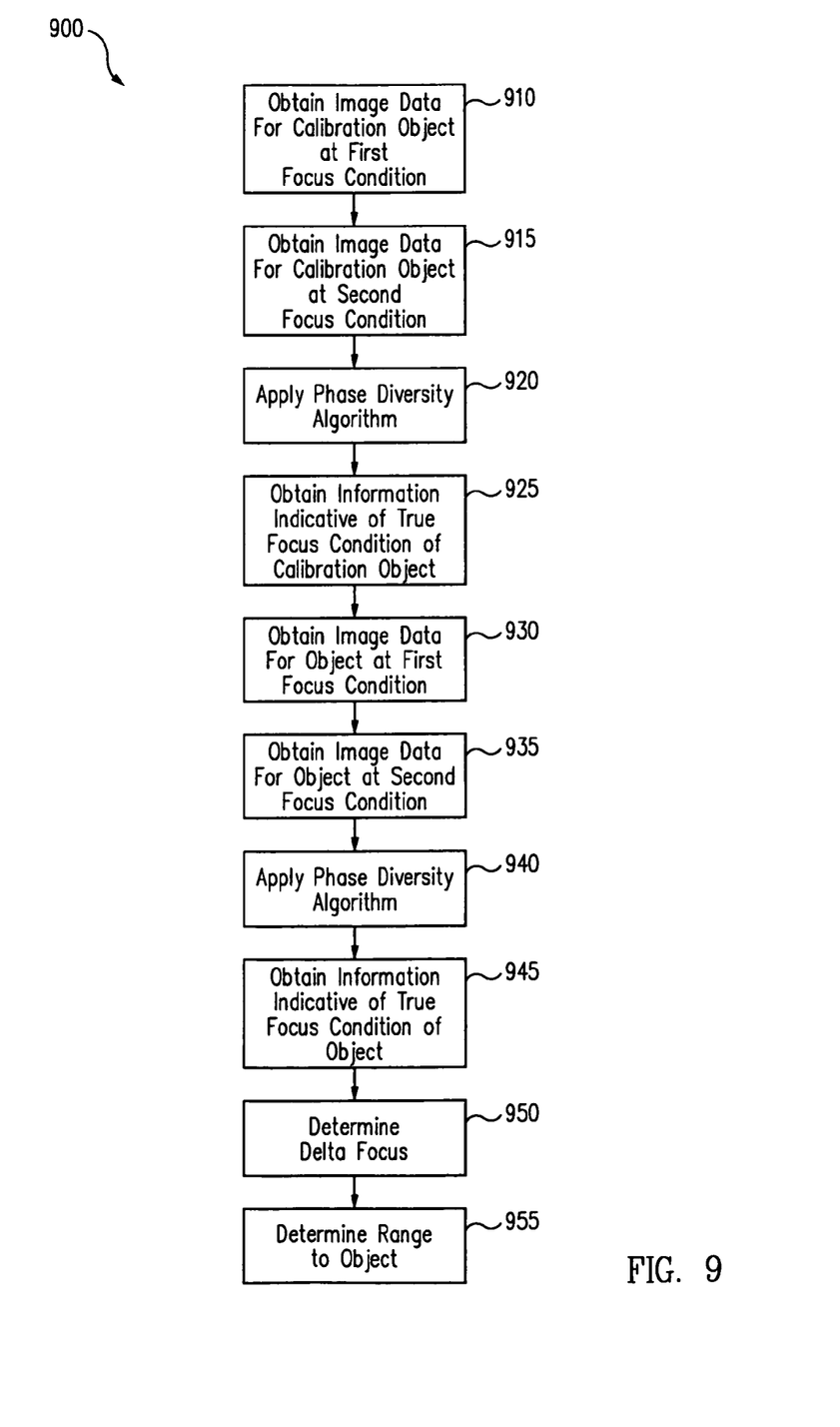
FIG. 9 is a method to determine distance using image information from at least two focus conditions.

FIG. 9 shows a method 900 that may be used to determine the distance to an object, using a sufficiently distant calibration object such as a star.

At 910, image data for the calibration object is obtained at a first focus condition. At 915, image data for the calibration object is obtained at a second different focus condition. The first and second focus conditions may be inside and outside of focus, or one at-focus, and one out of focus.

At 920, a phase diversity algorithm (such as the examples noted above) is used to analyze the image data at the first focus condition and the second focus condition. For example, a phase diversity algorithm may be used for wavefront estimation based on known aberration and diversity defocus. At 925, information indicative of the true focus position of the calibration object is obtained as an output of the diversity algorithm.

At 930, image data for the object itself is obtained at a first focus condition, and at 935 image data for the object is obtained at a second different focus condition. At 940, a phase diversity algorithm is used to analyze the image data at the first and second focus conditions, and at 945, information indicative of the true focus position of the object is obtained as the output of the diversity algorithm. The true focus position of the object may be referred to as the "image distance," which is different than the range (distance to the object).

At 950, the difference between the true focus positions of the object and the calibration object, delta_focus, is obtained (e.g., it can be provided as an output of the phase diversity algorithm). At 955, the range is determined using the above information and the focal length of the optical system. For example, Object_Range may be determined as outlined below in Equation (3):

$$\text{Object\_Range} = \frac{1}{\left[\frac{1}{\text{focal\_length}} - \frac{1}{(\text{image\_dist} - \text{delta\_focus})}\right]}$$

Other embodiments are possible. For example, if the object is moving, the calibration object may be the object itself at a previous position, and current range can be determined based on the difference in positions at two times.

Additionally, rather than using a real phase diversity algorithm (such as one of those mentioned above), the ray-paths between the two images can be geometrically traced to determine where the "true" focus between them should be. Although this technique may reduce the computational complexity, it may be challenging for imperfect optical systems, or where the object is starting to be resolved and has an irregular shape. For those situations, phase diversity may be the preferred approach.

In implementations, the above described techniques and their variations may be implemented at least partially as computer software instructions. Such instructions may be stored on one or more machine-readable storage media or devices and are executed by, e.g., one or more computer processors, or cause the machine, to perform the described functions and operations.

A number of implementations have been described. Although only a few implementations have been disclosed in detail above, other modifications are possible, and this disclosure is intended to cover all such modifications, and most particularly, any modification which might be predictable to a person having ordinary skill in the art. For example, many types and configurations of imaging lenses may be used in the optical systems described above, such as lenses typically found in instruments such as cameras (still and/or video), telescopes, etc. Many types of aberrating elements may be used as well, including but not limited to cylindrical lenses, tilted transparent substrates positioned in a converging wavefront, deformable lenses, deformable mirrors, variable-tilt transparent substrates, and the like. Different wavelengths of light may be used for distance determination, including visible light, infrared light (including near infrared light), ultraviolet (UV) light, or other wavelength. The term "optical" herein thus applies to wavelengths outside the visible spectrum, as well as visible light.

Also, only those claims which use the word "means" are intended to be interpreted under 35 USC 112, sixth paragraph. In the claims, the word "a" or "an" embraces configurations with one or more element, while the phrase "a single" embraces configurations with only one element, notwithstanding the use of phrases such as "at least one of" elsewhere in the claims. Moreover, no limitations from the specification are intended to be read into any claims, unless those limitations are expressly included in the claims. Accordingly, other embodiments are within the scope of the following claims.

What is claimed is:

1. An optical system comprising:
   an imaging lens positioned to receive light from an object;
   one or more aberrating elements configured and positioned in the optical path of the light to receive light from the imaging lens and configured to aberrate the light from the imaging lens to produce aberrated light by introducing astigmatism into the optical path;
   a detection system configured to receive aberrated light from the one or more aberrating elements at a first focus condition and a second focus condition and to generate information indicative of the aberrated light at the first focus condition and the second focus condition; and
   a processor system configured to receive the information indicative of the aberrated light at the first focus condition and information indicative of aberrated light at the second focus condition and to generate distance information therefrom.

2. The optical system of claim 1, wherein the one or more aberrating elements comprise a cylindrical lens.

3. The optical system of claim 1, wherein the one or more aberrating elements comprise a deformable optical element.

4. The optical system of claim 1, wherein the one or more aberrating elements comprise a substantially planar plate tilted with respect to the light from the object, wherein the plate is positioned to receive converging light from the imaging lens and introduce astigmatism into the optical path by tilting the planar plate.

5. The optical system of claim 1, further comprising a beam splitter configured to split light from the object into at least a first portion and a second portion, and wherein the detection system comprises a first detection element positioned to receive the first portion at a first focus condition and a second detection element positioned to receive the second portion at a second different focus condition.

6. The optical system of claim 5, wherein the beam splitter is integrated with at least one of the one or more aberrating elements.

7. The optical system of claim 1, wherein the detection system comprises a single detector having a first region and a second region, and wherein the first region is positioned to receive light at the first focus condition and the second region is positioned to receive light at the second focus condition.

8. The optical system of claim 7, wherein the first region and the second region at least partially overlap.

9. The optical system of claim 1, wherein the detection system comprises a first detector and a second detector separate from the first detector.

10. The optical system of claim 1, wherein the one or more aberrating elements include at least one selected from the group consisting of a cylindrical lens, a tilted transparent planar substrate, a deformable lens, a deformable mirror, and a variable-tilt transparent planar substrate.

11. The system of claim 1, wherein the imaging lens comprises one or more lens types selected from the group consisting of a camera lens and a telescope lens.

12. The system of claim 1, wherein the one or more aberrating elements are configured to introduce astigmatism into the system.

13. The system of claim 1, wherein the one or more aberrating elements comprise a substantially planar plate positioned to receive light from the imaging lens.

14. The system of claim 13, wherein the substantially planar plate is removable or rotatable or both.

15. The system of claim 13, wherein detection system comprises a single detector having a first region and a second region, and wherein the first region is positioned to receive light from a first portion of the substantially planar plate at the first focus condition and the second region is positioned to receive light at the second focus condition from a second portion of the substantially planar plate.

16. A method of determining an object distance comprising:
   receiving light from an object via an imaging lens;
   introducing a pre-determined aberration to light received from the imaging lens to generate an aberrated wavefront by introducing astigmatism into the optical path;
   obtaining image data of the aberrated wavefront at a first focus condition aid a second different focus condition;
   determining the object distance using the image data at the first focus condition and the second focus condition.

17. The method of claim 16, further comprising:
   receiving divergent light from the object at a lens and generating a converging wavefront therefrom; and wherein introducing the pre-determined aberration to the light received from the object comprises introducing the pre-determined aberration to the converging wavefront to generate the aberrated wavefront.

18. The method of claim 16, wherein determining the object distance using the image data at the first focus condition and the second focus condition comprises generating one or more wavefront coefficients using a phase diversity algorithm to process the image data at the first focus condition and the second focus condition.

19. The method of claim 18, wherein determining the object distance using the image data at the first focus condition and the second focus condition comprises determining the object distance using the one or more wavefront coefficients.

20. The method of claim 16, further comprising determining the object distance using calibration information.

* * * * *